United States Patent [19]

Dahlberg et al.

[11] Patent Number: 5,381,552
[45] Date of Patent: Jan. 10, 1995

[54] PROGRAMMABLE SYSTEM FOR PRIORITIZING AND COLLECTING CENTRAL PROCESSOR UNIT INTERRUPTS

[75] Inventors: James A. Dahlberg, Eagan; David G. Fangmeier, Apple Valley; Kermit E. Frye, Bloomington, all of Minn.

[73] Assignee: Ceridian Corporation, Bloomington, Minn.

[21] Appl. No.: 54,001

[22] Filed: Apr. 26, 1993

[51] Int. Cl.$^6$ .......................... G06F 13/26; G06F 9/46
[52] U.S. Cl. .................................. 395/725; 370/85.6; 340/825.51; 364/241.2; 364/241.3; 364/241.4; 364/241.5; 364/230.1; 364/238; 364/259; 364/259.2; 364/DIG. 1
[58] Field of Search ............... 395/725, 800, 325, 275; 370/85.6; 340/825.5, 825.51

[56] References Cited

U.S. PATENT DOCUMENTS

| | | | |
|---|---|---|---|
| 3,828,325 | 8/1974 | Stafford et al. | 395/275 |
| 4,275,458 | 6/1981 | Khera | 364/900 |
| 4,470,111 | 9/1984 | Jenkins et al. | 395/275 |
| 4,533,994 | 8/1985 | Harrill et al. | 395/275 |
| 4,914,580 | 4/1990 | Jensen et al. | 395/325 |
| 5,077,662 | 12/1991 | Hutson | 395/725 |
| 5,083,261 | 1/1992 | Wilkie | 395/725 |
| 5,133,056 | 7/1992 | Miyamori | 395/275 |
| 5,134,706 | 7/1992 | Cushing et al. | 395/725 |
| 5,257,383 | 10/1993 | Lamb | 395/725 |
| 5,274,825 | 12/1993 | LeMay et al. | 395/725 |
| 5,283,904 | 2/1994 | Carson et al. | 395/725 |

OTHER PUBLICATIONS

Birch et al, "Priority Determination and Servicing I/O Devices", IBM Technical Disclosure Bulletin, vol. 16, No. 3, Aug. 1973, pp. 874–875.
Beukema et al, "Asynchronous Command Prioritization", IBM Technical Disclosure Bulletin, vol. 23, No. 4, Sep. 1980, pp. 1610–1614.

Primary Examiner—Gopal C. Ray
Attorney, Agent, or Firm—Kinney & Lange

[57] ABSTRACT

A priority selector prioritizes interrupts associated with each ASIC of a plural ASIC system in accordance with a programmed sequence. A table in each ASIC contains a programmable offset table and a programmable priority code table. The table selects an offset value and a priority code associated with the highest priority interrupt for the ASIC. An interrupt collector includes a priority compare to identify the priority code of the highest-priority interrupt of all of the ASICs. A multiplexer selects the offset value associated with it. The offset value forms a jump or offset address to the interrupt for the CPU. The priority sequencing, offset tables, priority code tables and priority compare values are programmable, so the prioritizing is adjustable. Each priority selector generates an interrupt active signal for the CPU. A mask disables interrupts until serviced by the CPU so that any interrupt active signal resulting from a disabled interrupt is terminated.

6 Claims, 5 Drawing Sheets

PROGRAMMABLE SYSTEM FOR PRIORITIZING AND COLLECTING CENTRAL PROCESSOR UNIT INTERRUPTS

The United States Government has rights in this contract pursuant to contract (or award) No. F04606-90-D-0003 awarded to the United States Air Force.

BACKGROUND OF THE INVENTION

This invention relates to processor modules, and particularly to an integrated programmable external interrupt system for a central processing unit on a module.

Various conditions in a processor module require interrupting the normal flow of instructions executed by the central processing unit (CPU). Some of these conditions arise internal to the CPU (internal interrupts) and some arise external to the CPU (external interrupts). The present invention is directed to the handling of external interrupts.

Processor modules often contain plural application specific integrated circuits (ASICs), each being a potential source of interrupts. Prior processor modules relied on using one interrupt from each of the ASICs. This required the CPU to read ASIC interrupt registers to determine which interrupt(s) were active each ASIC. Potential interrupts in one ASIC do not necessarily have a higher priority than interrupts another ASIC. Moreover several ASICs can have active interrupts at the same time. Consequently, it was a complicated and time consuming task for the CPU to sort through the various interrupt registers to determine the highest priority interrupt.

Prior processor modules had no mechanism for changing the priorities of individual interrupts, once the module design was completed. Consequently, it was difficult or impossible to correct system problems which arose due to incorrect assignment of priorities.

SUMMARY OF THE INVENTION

A programmable priority interrupt controller prioritizes interrupts from plural ASICs to a CPU. The apparatus includes a priority selector at each ASIC to prioritize interrupts associated with the ASIC in accordance with a programmed sequence. A register file or lookup table in the ASIC contains a programmable offset table and a programmable priority code table. The table supplies an offset value and a priority code associated with the highest priority active interrupt. An interrupt collector includes priority compare having a programmable priority compare table to identify the priority code of the highest-priority interrupt of all of the ASICs, and a multiplexer is responsive to the priority compare to select the offset value associated with the highest-priority interrupt. The offset value forms a jump or offset address to the interrupt for the CPU.

The priority sequencing, offset tables, priority code tables and priority compare values are programmable, so the prioritizing is adjustable.

Preferably, each priority selector generates an interrupt active signal, and the interrupt collector provides an interrupt active signal to the central processor unit when there is an active interrupt in the system. A mask disables interrupts until serviced so that any interrupt active signal resulting from the disabled interrupt is terminated.

DETAILED DESCRIPTION OF THE PREFERRED EMBODIMENTS

Figure 1:
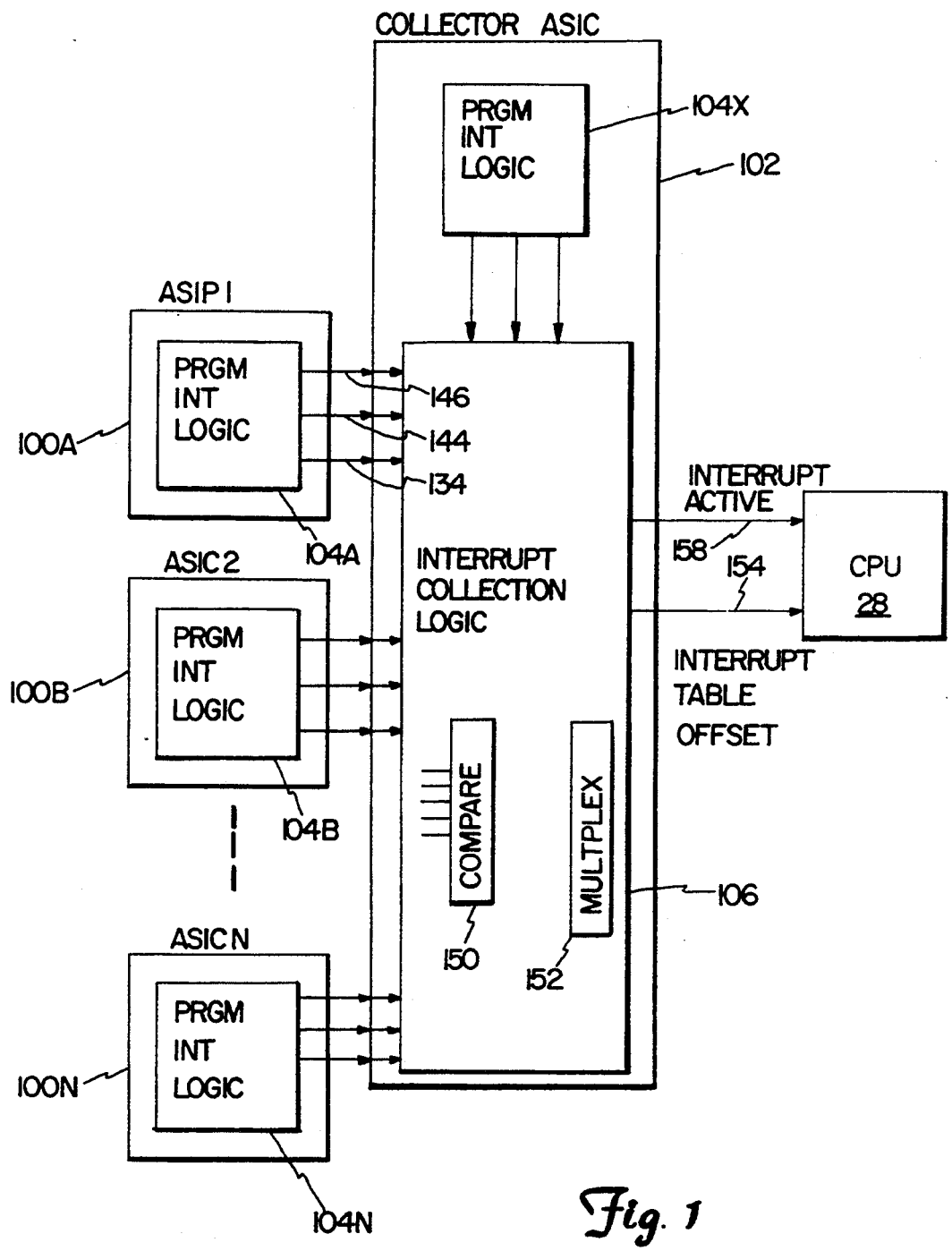
FIG. 1 is a top level block diagram of the interrupt system according to the present invention illustrating connections between ASICs and a CPU.

FIG. 1 is a block diagram of interrupt logic in each application specific integrated circuit (ASIC) 100A, 100B, . . . 100N and collector ASIC 102. Each ASIC includes programmable interrupt logic 104A, 104B, . . . 104N, 104X arranged to identify and prioritize interrupts generated by the respective ASIC. Each interrupt logic 104 produces a priority code representing the priority level for that ASIC's highest priority active interrupt. Interrupt collection logic 106 of collector ASIC 102 includes compare logic 150 which compares the priority code values received from the several logics 104 and selects the highest offset value in multiplexer 152; the selected offset representing the highest priority active interrupt in the system. Central processor unit (CPU) 28 connected to logic 106 for reading the offset value from multiplexer 152.

Figure 2:
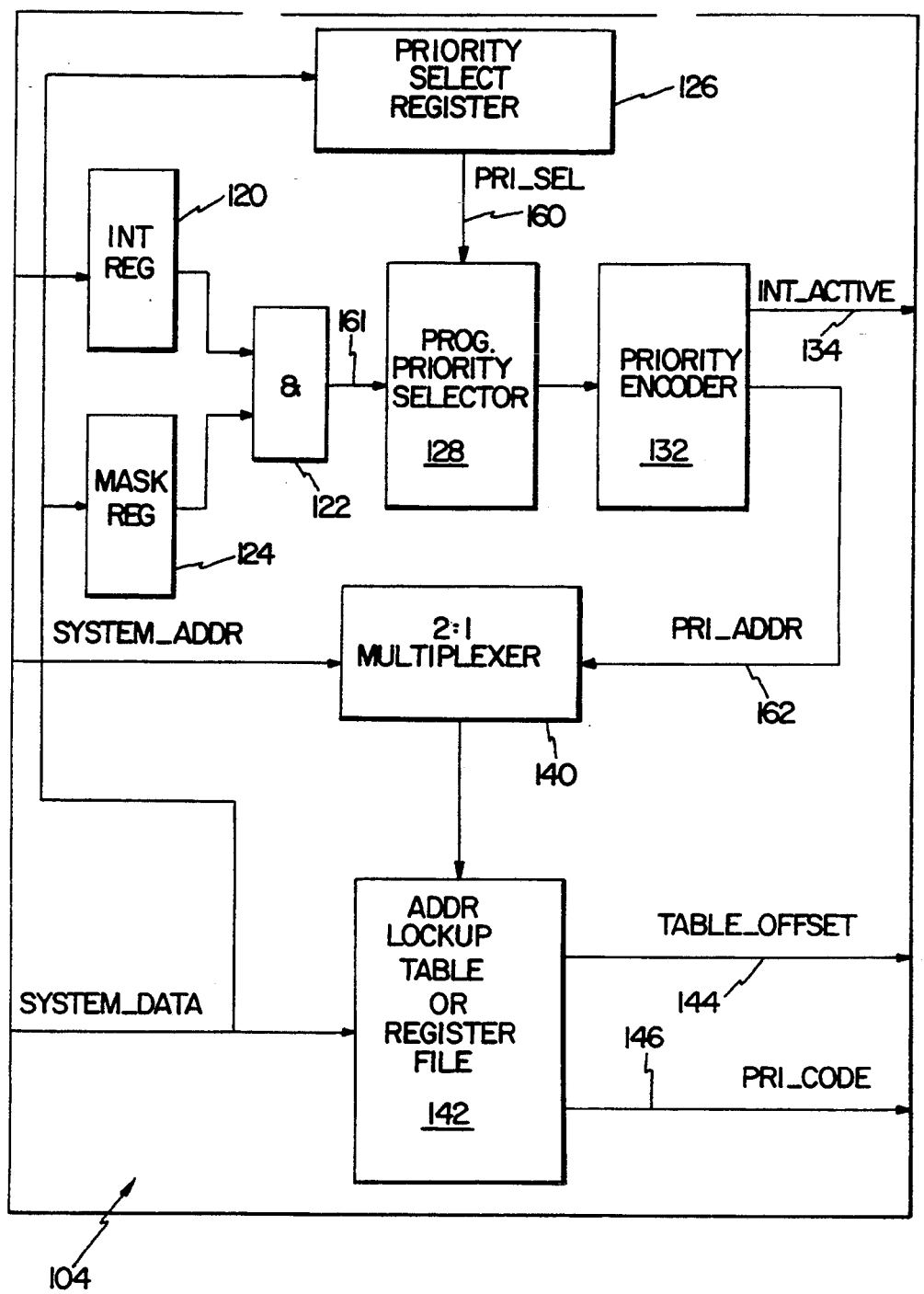
FIG. 2 is a block diagram of logic in each ASIC for programmable interrupts used in the present invention.

The programmable interrupt logic 104 is illustrated in greater detail in FIG. 2. Interrupt register 120 captures individual system interrupts and interrupts generated inside the individual ASIC and provides an output which is logically ANDed at gate 122. Mask data is provided by mask register 124 for purposes to be explained. Priority select registers 126 are preprogrammed to assign each individual interrupt a predetermined priority level by unique priority codes; the priority codes, and hence, the priority level, being changeable by changes to the program. The output 160 of priority select registers 126 provides multiplexer control for programmable priority selector 128.

Figure 3:
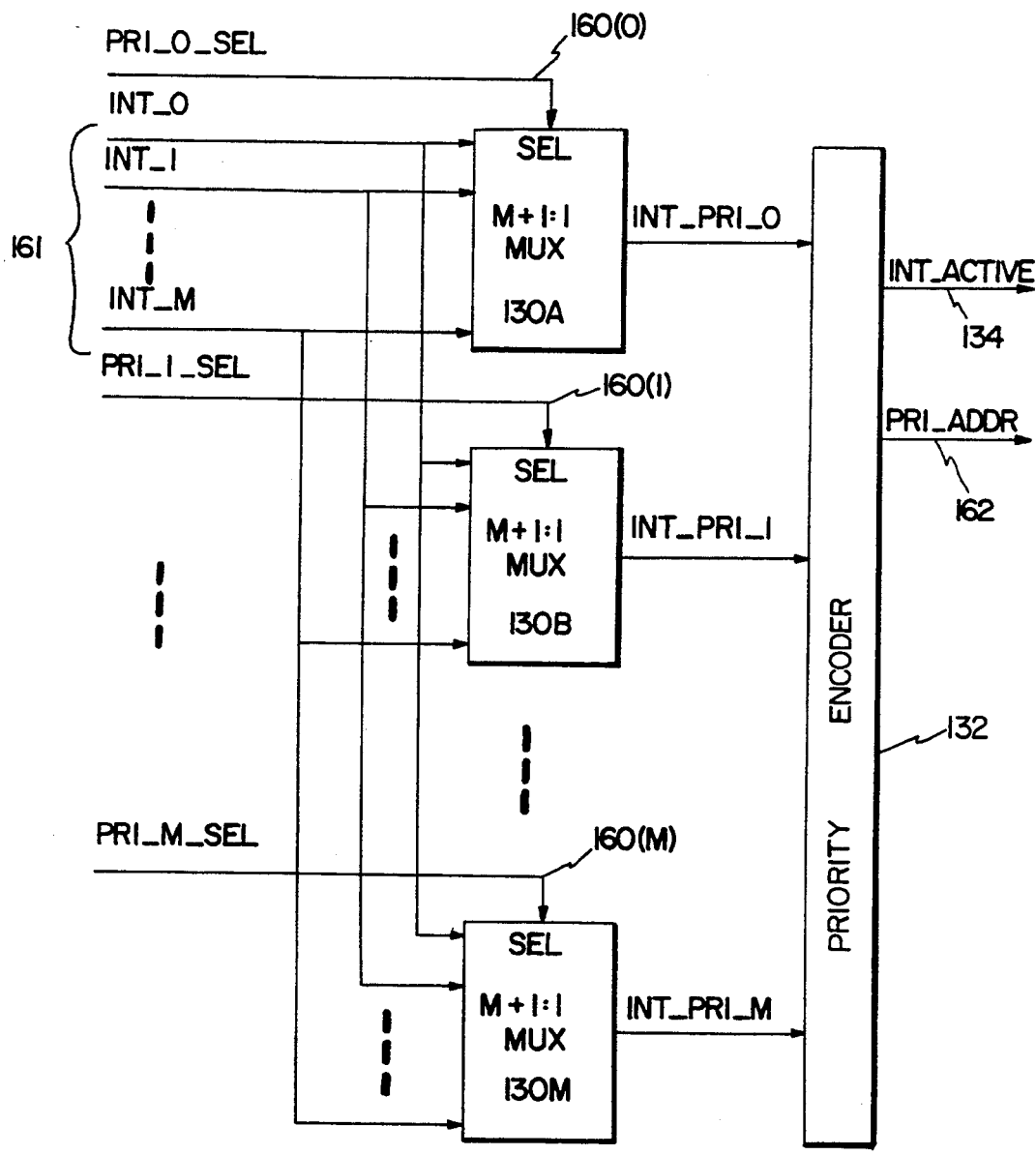
FIG. 3 is a block diagram of logic for programmable priority selection.

FIG. 3 illustrates the details of programmable priority selector 128. A plurality of multiplexers 130A, 130B, . . . 130M and priority encoder 132 permit any system interrupt to be programmed to any level of priority. More particularly, the number, M+1, of multiplexers 130 is equal to the number, M+1, of possible interrupts for the ASIC. Additionally, each multiplexer 130 has M+1 inputs 161, each representing a possible interrupt. Each multiplexer 130 has an input at 160 representing a unique priority select number from priority select register 126 (FIG. 2). As an example, if interrupt 3 is the highest priority interrupt, multiplexer 130A is programmed with a priority select number to select interrupt 3 as the highest priority interrupt for the ASIC. Priority encoder 132 examines the active system interrupts and places a unique priority address code at its output 162 to multiplexer 140. The priority encoder also provides an interrupt active signal at output at 134 to indicate that an interrupt is active.

Multiplexer 140 selects either the priority code address from priority encoder 132 or a system register file address from the system. During initialization, when the system software is loading the register file 142, multiplexer 140 will provide the system register file address to register file 142. The remainder of the time multiplexer 140 will provide the priority code address from priority encoder 132. Register file or lookup table 142 contains an interrupt table offset and a priority code for the individual system interrupts. The register file or lookup table 142 selects an offset value from the file or table based on the address of the highest priority interrupt from priority encoder 132 selected by multiplexer 140 (FIG. 2).

After the system is initialized and operating, an interrupt in an ASIC will be received by interrupt register 120 and prioritized. An interrupt active signal is placed at output 134 and the file address of the interrupt is provided to register file 142. That address is used to select an offset value from the interrupt table offset, the offset value being placed at output 144, and to select a priority code placed at output 146.

Once the interrupt has been recognized, the system software will operate mask register 124 to mask, or disable, the interrupt until the interrupt processing is completed and the interrupt can be cleared. Thus, mask register 124 contains the disable information for the individual interrupts.

Figure 4:
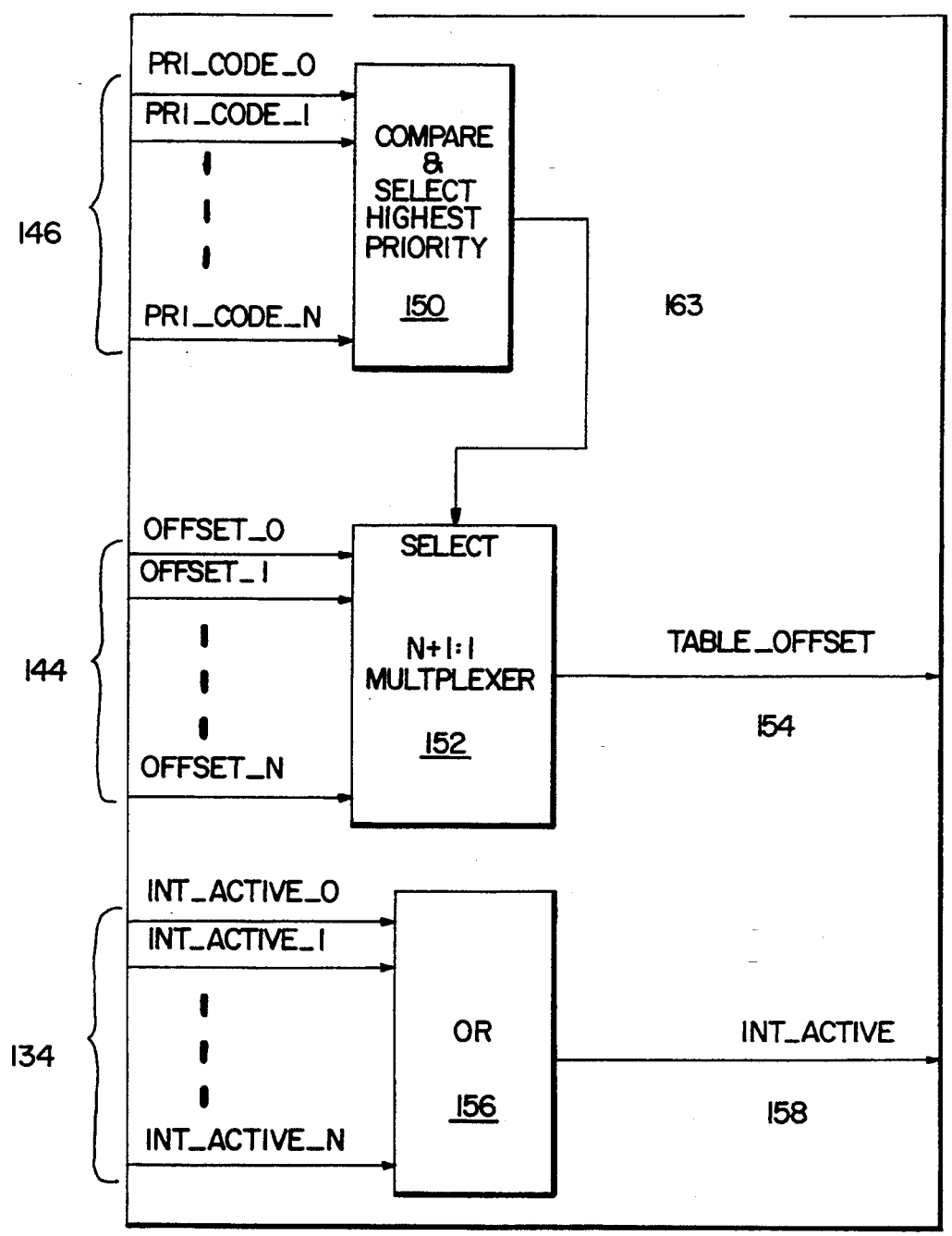
FIG. 4 is a block diagram of the interrupt collection circuitry in the collector ASIC.

FIG. 4 shows the collection logic 106 in the interrupt collection ASIC 102. Compare and select logic 150 compares the priority codes on lines 146 from all ASICs and supplies the highest priority code to multiplexer 152 via channel 163 to select the priority offset value from the ASIC having the associated highest priority. Thus, the priority code from each ASIC is used to select the highest priority offset value in the collector ASIC. The selected offset value is supplied to CPU 28 via line 154 and is used to point to a unique interrupt vector or jump address to obtain the system interrupt vector.

Or gate 156 ORs the interrupt active inputs on lines 134 from the plurality of ASICs to provide an interrupt active signal on line 158 to CPU 28.

Figure 5:
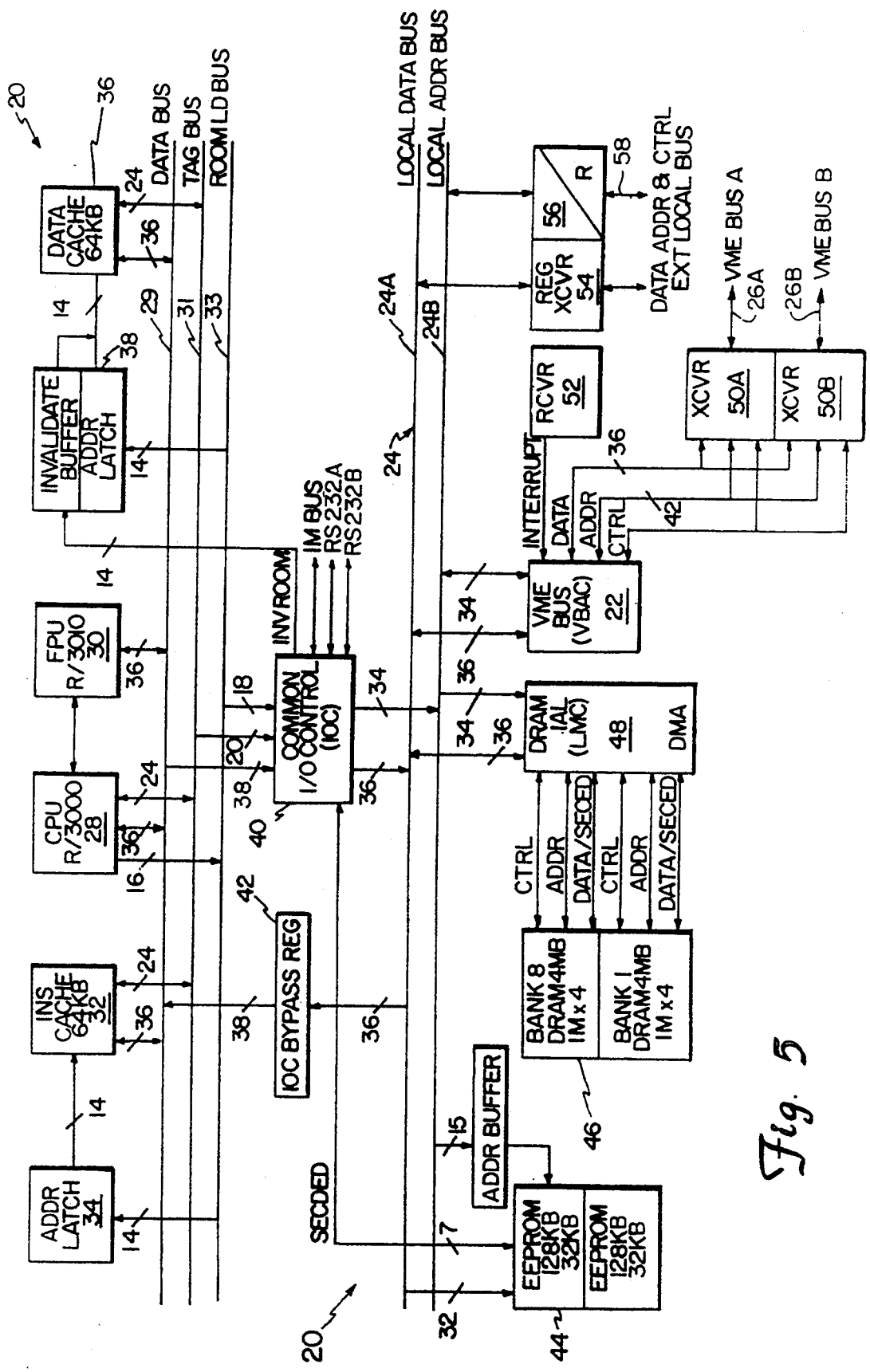
FIG. 5 is a schematic diagram of a processor module illustrating the incorporation of an interrupt system according to the present invention.

FIG. 5 illustrates the incorporation of the interrupt system of the present invention into a processor module. Thus, FIG. 5 illustrates a processor module 20 which is shown and described in greater detail the Peterson et al. U.S. Pat. No. 5,305,442 which was filed Mar. 27, 1992 and issued Apr. 19, 1994 and assigned to the same Assignee as the present invention, the disclosure of which is incorporated herein by reference.

VMEbus adapter chip (VBAC) 22 provides an interface between local bus 24 and two VMEbuses 26A and 26B. A VMEbus or Versatile Backplane Bus is a standard system bus commonly used in computer systems. Local bus 24 comprises local data bus 24A and local address bus 24B and communicates between devices within computer platform 20. More particularly, local bus 24 provides connection between electronically erasable programmable ROM (EEPROM) 44, local DRAM memory 46 through control 48, receiver 52 which provides interrupts to VBAC 22, transmitter/receivers 54 and 56 which themselves are connected to external local buses 58, transmitter/receivers 50A and 50B which are connected to external or system VMEbuses 26A and 26B to communicate to other modules in the total system, and input/output control (IOC) chip 40 which provides connection to data bus 29, tag bus 31 and address bus 33. The other modules may be configured like platform 20 and include a VBAC 22.

Devices attached to data, tag and address buses 29, 31 and 33 include central processing unit (CPU) 28, floating-point coprocessor (FPU) 30, instruction cache 32, address latch chip 34, data cache 36, and address latch and invalidate buffer chip 38. IOC 40 provides local bus arbitration of communication and control between local bus 24 and the data bus 29, tag bus 31, and address bus 33. A test and maintenance serial bus 62 and a RS232 industry standard low speed interface 60 for devices such as a program console, are connected through IOC 40 to local bus 24. IOC bypass register 42 provides a direct path from local data bus 24A to data bus 29. EEPROM 44 is also connected to local bus 24. VBAC 22 synchronizes asynchronous operations in implementing the local bus to the VMEbus adapter 50.

Each ASIC subject to interrupt control may have a programmable interrupt logic 104 according to the present invention. Thus, logic 104 may be included in DRAM controller 48, VBAC 22, cache 32, floating point unit 30 and cache 36, to name a few. IOC 40 preferably contains both a programmable interrupt logic 104 as well as the interrupt collection logic 106. Thus, IOC 40 serves as the collector ASIC 102 described above. The priority associated with each device and in each collector is programmable through the CPU 28 and buses 24, 29, 31 and 33. Priority codes, offset codes, tables and sequences may be stored in EPROMs, EEPROMs, RAMs, registers, multiplexers, etc. and may be loaded or altered under the control of the CPU 28 and I/O control 40, operating through buses 24, 29, 31 and 33, as appropriate.

Although the present invention has been described with reference to preferred embodiments, workers skilled in the art will recognize that changes may be made in form and detail without departing from the spirit and scope of the invention.

What is claimed is:

1. A programmable priority interrupt system for prioritizing interrupts handled by a plurality of interrupt processing subsystems which provide offset values representative of the interrupts to a central processor unit comprising:

A. a portion from each of said interrupt processing subsystems, each said portion including:
   i) an input receiver for receiving interrupts associated with the respective interrupt processing subsystem,
   ii) a priority selector responsive to the respective input receiver for prioritizing interrupts associated with the respective interrupt processing subsystem in accordance with a programmed sequence, the priority selector selecting an interrupt address associated with an interrupt having the highest priority of the interrupts associated with the respective interrupt processing subsystem, and
   iii) a lookup table memory containing an offset table having programmable offset values representing the interrupts associated with the respective interrupt processing subsystem and a priority code table having programmable priority codes corresponding to the offset values and representing the relative system priority of the offset values, the lookup table memory being responsive to the priority selector for selecting an offset value from the offset table and a corresponding priority code from the priority code table associated with the interrupt address selected by the priority selector;

B. an interrupt collector comprising:

i) a priority comparator responsive to the lookup table memory in all of the interrupt processing subsystems for comparing the priority codes from the interrupt processing subsystems and for selecting a priority code representing the offset value with the highest system priority, and ii) a multiplexing processor responsive to the priority comparator and to the lookup table memory in all of the interrupt processing subsystems for selecting the offset value from the lookup table memory corresponding to the priority code selected by the priority comparator;

C. an offset value sender responsive to the multiplexing processor for supplying the offset value selected by the multiplexing processor to the central processor unit; and D. a program selector connected to the priority selector and the lookup table memory in each interrupt processing subsystem for selectively altering the priority sequences in the priority selector, the offset values in the offset tables in the lookup table memory, and the priority codes in the priority code tables in the lookup table memory.

2. Apparatus as in claim 1, wherein each input receiver includes a mask selector for disabling interrupts.

3. Apparatus as in claim 1, wherein the interrupt collector is incorporated in one of the interrupt processing subsystems.

4. Apparatus as in claim 1, wherein each priority selector includes an interrupt active generator responsive to an interrupt received at the respective input receiver for generating an interrupt active signal, and the interrupt collector includes logic responsive to each interrupt active generator to provide an interrupt active signal to the central processor unit.

5. Apparatus as in claim 4, wherein each input receiver includes a mask selector for disabling interrupts, the respective generator being responsive to the disabling of an interrupt to terminate generation of an interrupt active signal.

6. Apparatus as in claim 1, wherein each interrupt processing subsystem is implemented in an application-specific integrated circuit.

* * * * *

UNITED STATES PATENT AND TRADEMARK OFFICE
CERTIFICATE OF CORRECTION

PATENT NO. : 5,381,552

DATED : January 10, 1995

INVENTOR(S) : JAMES A. DAHLBERG, DAVID G. FANGMEIER, KERMIT E. FRYE

It is certified that error appears in the above-indentified patent and that said Letters Patent is hereby corrected as shown below:

Col. 1, line 29, after "interrupts", insert --in--

Signed and Sealed this

Twenty-fifth Day of April, 1995

Attest:

BRUCE LEHMAN

Attesting Officer         Commissioner of Patents and Trademarks